(12) United States Patent
Kuriyama

(10) Patent No.: US 10,906,355 B2
(45) Date of Patent: Feb. 2, 2021

(54) PNEUMATIC TIRE

(71) Applicant: The Yokohama Rubber Co., LTD., Tokyo (JP)

(72) Inventor: Masatoshi Kuriyama, Hiratsuka (JP)

(73) Assignee: The Yokohama Rubber Co., LTD.

( * ) Notice: Subject to any disclaimer, the term of this patent is extended or adjusted under 35 U.S.C. 154(b) by 298 days.

(21) Appl. No.: 15/747,437

(22) PCT Filed: May 11, 2016

(86) PCT No.: PCT/JP2016/064065
§ 371 (c)(1),
(2) Date: Jan. 24, 2018

(87) PCT Pub. No.: WO2017/018020
PCT Pub. Date: Feb. 2, 2017

(65) Prior Publication Data
US 2018/0215203 A1 Aug. 2, 2018

(30) Foreign Application Priority Data
Jul. 27, 2015 (JP) .................. 2015-147929

(51) Int. Cl.
*B60C 11/03* (2006.01)
*B60C 11/01* (2006.01)
(Continued)

(52) U.S. Cl.
CPC .......... *B60C 11/0304* (2013.01); *B60C 11/01* (2013.01); *B60C 11/032* (2013.01);
(Continued)

(58) Field of Classification Search
CPC ... B60C 11/125; B60C 11/0304; B60C 11/03; B60C 11/12; B60C 11/13;
(Continued)

(56) References Cited

U.S. PATENT DOCUMENTS 5,833,779 A * 11/1998 van der Meer ..... B60C 11/0309
152/209.15
7,597,127 B2 * 10/2009 Mathews ................ B60C 11/11
152/209.18
(Continued)

FOREIGN PATENT DOCUMENTS

CN 103182903 7/2013
DE 102011050705 A1 * 12/2012 ........... B60C 11/045
(Continued)

OTHER PUBLICATIONS

International Search Report for International Application No. PCT/JP2016/064065 dated Aug. 9, 2016, 4 pages, Japan.

*Primary Examiner* — Steven D Maki
*Assistant Examiner* — Cedrick S Williams
(74) *Attorney, Agent, or Firm* — Thorpe North & Western

(57) ABSTRACT

A pneumatic tire comprises a tread portion with a tread surface; four main grooves in the tread surface of the tread portion, extending in a tire circumferential direction; and a center land portion, middle land portions adjacent to the center land portion on either side in a tire lateral direction, and shoulder land portions outwardly adjacent to the middle land portions in the tire lateral direction formed by the main grooves. The main grooves have a wave-like shape with a constant groove width in the tire circumferential direction and with periodic oscillation.

12 Claims, 9 Drawing Sheets

(51) Int. Cl.
  *B60C 11/13* (2006.01)
  *B60C 11/12* (2006.01)

(52) U.S. Cl.
  CPC ........ *B60C 11/0306* (2013.01); *B60C 11/125* (2013.01); *B60C 11/1236* (2013.01); *B60C 11/13* (2013.01); *B60C 11/1392* (2013.01); *B60C 2011/013* (2013.01); *B60C 2011/0346* (2013.01); *B60C 2011/0348* (2013.01); *B60C 2011/0353* (2013.01); *B60C 2011/0355* (2013.01); *B60C 2011/0358* (2013.01); *B60C 2011/0365* (2013.01); *B60C 2011/0367* (2013.01); *B60C 2011/0381* (2013.01); *B60C 2011/1209* (2013.01)

(58) Field of Classification Search
  CPC ..... B60C 2011/0311; B60C 2011/0381; B60C 2011/0346; B60C 2011/1213
  See application file for complete search history.

(56) References Cited

U.S. PATENT DOCUMENTS

| | | |
|---|---|---|
| 9,120,355 B2 | 9/2015 | Kakinuma et al. |
| 2007/0051448 A1 | 3/2007 | Yumii |
| 2009/0236021 A1 | 9/2009 | Yumii |
| 2012/0211135 A1* | 8/2012 | Kojima ................... B60C 11/01 152/209.16 |
| 2013/0167995 A1* | 7/2013 | Hada ................... B60C 11/1369 152/209.9 |
| 2014/0124111 A1 | 5/2014 | Yumii |
| 2015/0151584 A1 | 6/2015 | Koishikawa |
| 2016/0303919 A1* | 10/2016 | Yamaoka ............ B60C 11/0332 |
| 2017/0253089 A1* | 9/2017 | Hayashi ................... B60C 11/01 |
| 2018/0015788 A1* | 1/2018 | Hayashi ................... B60C 11/03 |
| 2018/0215206 A1* | 8/2018 | Kuriyama ............... B60C 11/13 |

FOREIGN PATENT DOCUMENTS

| | | |
|---|---|---|
| JP | S61-175104 | 8/1986 |
| JP | S62-299407 | 12/1987 |
| JP | H05-178015 | 7/1993 |
| JP | H06-191229 | 7/1994 |
| JP | H09-011708 | 1/1997 |
| JP | 2012066797 A * | 4/2012 |
| JP | 2013-220780 | 10/2013 |
| JP | 2014-076764 | 5/2014 |
| WO | WO 2004/103737 | 12/2004 |
| WO | WO 2014/030476 | 2/2014 |

* cited by examiner

|  |  | CONVENTIONAL EXAMPLE | EXAMPLE 1 | EXAMPLE 2 | EXAMPLE 3 | EXAMPLE 4 |
|---|---|---|---|---|---|---|
| MAIN GROOVE SHAPE | | WAVE-LIKE SHAPE WITH OSCILLATION (VARIED GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) |
| CENTRAL LAND PORTION | LUG GROOVE | TERMINATES WITHIN LAND PORTION AT ONE END PORTION | TERMINATES WITHIN LAND PORTION AT ONE END PORTION | TERMINATES WITHIN LAND PORTION AT ONE END PORTION | COMMUNICATES WITH MAIN GROOVE AT BOTH ENDS | COMMUNICATES WITH MAIN GROOVE AT BOTH ENDS |
| | NARROW GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| MIDDLE LAND PORTION ON VEHICLE INNER SIDE | LUG GROOVE | TERMINATES WITHIN LAND PORTION AT ONE END PORTION | TERMINATES WITHIN LAND PORTION AT ONE END PORTION | TERMINATES WITHIN LAND PORTION AT ONE END PORTION | COMMUNICATES WITH MAIN GROOVE AT BOTH ENDS | COMMUNICATES WITH MAIN GROOVE AT BOTH ENDS |
| | NARROW GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| MIDDLE LAND PORTION ON VEHICLE OUTER SIDE | AUXILIARY GROOVE | NO | NO | YES | YES | YES |
| | LUG GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | TERMINATES WITHIN LAND PORTION AT ONE END PORTION | TERMINATES WITHIN LAND PORTION AT ONE END PORTION |
| SHOULDER LAND PORTION | LUG GROOVE | COMMUNICATES WITH MAIN GROOVE | COMMUNICATES WITH MAIN GROOVE | COMMUNICATES WITH MAIN GROOVE | COMMUNICATES WITH MAIN GROOVE | NOT COMMUNICATING WITH MAIN GROOVE |
| | NARROW GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE |
| | COMMUNICATION NARROW GROOVE? | NO | NO | NO | NO | NO |
| | LUG NARROW GROOVE? | NO | NO | NO | NO | NO |
| | RECESSED PORTION? | NO | NO | NO | NO | NO |
| DIFFERENCE IN GROOVE AREA RATIO BETWEEN VEHICLE INNER SIDE AND VEHICLE OUTER SIDE (%) | | 5 | 5 | 5 | 5 | 5 |
| WEAR RESISTANCE PERFORMANCE | | 100 | 102 | 102 | 102 | 104 |
| BRAKING PERFORMANCE ON WET ROAD SURFACES | | 100 | 102 | 104 | 105 | 103 |

FIG. 7A

| | | EXAMPLE 5 | EXAMPLE 6 | EXAMPLE 7 | EXAMPLE 8 |
|---|---|---|---|---|---|
| MAIN GROOVE SHAPE | | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) |
| CENTRAL LAND PORTION | LUG GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| | NARROW GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| MIDDLE LAND PORTION ON VEHICLE INNER SIDE | LUG GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| | NARROW GROOVE | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS | COMMUNICATES WITH MAIN GROOVE AT BOTH ENDS |
| MIDDLE LAND PORTION ON VEHICLE OUTER SIDE | AUXILIARY GROOVE | YES | YES | YES | YES |
| | LUG GROOVE | TERMINATES WITHIN LAND PORTION AT ONE END PORTION | TERMINATES WITHIN LAND PORTION AT ONE END PORTION | TERMINATES WITHIN LAND PORTION AT ONE END PORTION | TERMINATES WITHIN LAND PORTION AT ONE END PORTION |
| SHOULDER LAND PORTION | LUG GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE |
| | NARROW GROOVE | NOT COMMUNICATING WITH MAIN GROOVE | NOT COMMUNICATING WITH MAIN GROOVE | COMMUNICATES WITH MAIN GROOVE | COMMUNICATES WITH MAIN GROOVE |
| | COMMUNICATION NARROW GROOVE? | YES | YES | YES | YES |
| | LUG NARROW GROOVE? | NO | YES | YES | YES |
| | RECESSED PORTION? | NO | NO | NO | YES NARROW GROOVE TERMINATING END? |
| DIFFERENCE IN GROOVE AREA RATIO BETWEEN VEHICLE INNER SIDE AND VEHICLE OUTER SIDE (%) | | 5 | 5 | 5 | 5 |
| WEAR RESISTANCE PERFORMANCE | | 103 | 102 | 102 | 102 |
| BRAKING PERFORMANCE ON WET ROAD SURFACES | | 104 | 105 | 106 | 106 |

FIG. 7B

|  |  | EXAMPLE 9 | EXAMPLE 10 | EXAMPLE 11 | EXAMPLE 12 |
|---|---|---|---|---|---|
| MAIN GROOVE SHAPE | | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) | WAVE-LIKE SHAPE WITH OSCILLATION (CONSTANT GROOVE WIDTH) |
| CENTRAL LAND PORTION | LUG GROOVE | COMMUNICATES WITH MAIN GROOVE AT BOTH ENDS; CHAMFER | COMMUNICATES WITH MAIN GROOVE AT BOTH ENDS; CHAMFER | COMMUNICATES WITH MAIN GROOVE AT BOTH ENDS; CHAMFER | COMMUNICATES WITH MAIN GROOVE AT BOTH ENDS; CHAMFER |
| | NARROW GROOVE | COMMUNICATES WITH MAIN GROOVE AT BOTH ENDS | TERMINATES WITHIN LAND PORTION AT ONE END PORTION | TERMINATES WITHIN LAND PORTION AT ONE END PORTION | TERMINATES WITHIN LAND PORTION AT ONE END PORTION |
| MIDDLE LAND PORTION ON VEHICLE INNER SIDE | LUG GROOVE | COMMUNICATES WITH MAIN GROOVE AT BOTH ENDS; CHAMFER | COMMUNICATES WITH MAIN GROOVE AT BOTH ENDS; CHAMFER | COMMUNICATES WITH MAIN GROOVE AT BOTH ENDS; CHAMFER | COMMUNICATES WITH MAIN GROOVE AT BOTH ENDS; CHAMFER |
| | NARROW GROOVE | COMMUNICATES WITH MAIN GROOVE AT BOTH ENDS | TERMINATES WITHIN LAND PORTION AT ONE END PORTION | TERMINATES WITHIN LAND PORTION AT ONE END PORTION | TERMINATES WITHIN LAND PORTION AT ONE END PORTION |
| MIDDLE LAND PORTION ON VEHICLE OUTER SIDE | AUXILIARY GROOVE | YES | YES | YES | YES |
| | LUG GROOVE | TERMINATES WITHIN LAND PORTION AT ONE END PORTION; CHAMFER | TERMINATES WITHIN LAND PORTION AT ONE END PORTION; CHAMFER | TERMINATES WITHIN LAND PORTION AT ONE END PORTION; CHAMFER | TERMINATES WITHIN LAND PORTION AT ONE END PORTION; CHAMFER |
| SHOULDER LAND PORTION | LUG GROOVE | NOT COMMUNICATING WITH MAIN GROOVE | NOT COMMUNICATING WITH MAIN GROOVE | NOT COMMUNICATING WITH MAIN GROOVE | NOT COMMUNICATING WITH MAIN GROOVE |
| | NARROW GROOVE | COMMUNICATES WITH MAIN GROOVE | COMMUNICATES WITH MAIN GROOVE | COMMUNICATES WITH MAIN GROOVE | COMMUNICATES WITH MAIN GROOVE |
| | COMMUNICATION NARROW GROOVE? | YES | YES | YES | YES |
| | LUG NARROW GROOVE? | YES | YES | YES | YES |
| | RECESSED PORTION? | YES NARROW GROOVE TERMINATING END? | YES NARROW GROOVE TERMINATING END? | YES NARROW GROOVE TERMINATING END? | YES NARROW GROOVE TERMINATING END, TWO ROWS |
| DIFFERENCE IN GROOVE AREA RATIO BETWEEN VEHICLE INNER SIDE AND VEHICLE OUTER SIDE (%) | | 5 | 5 | 2 | 2 |
| WEAR RESISTANCE PERFORMANCE | | 102 | 104 | 106 | 106 |
| BRAKING PERFORMANCE ON WET ROAD SURFACES | | 107 | 105 | 105 | 105 |

FIG. 7C

PNEUMATIC TIRE

TECHNICAL FIELD

The present technology relates to a pneumatic tire that can provide enhanced wear resistance performance while maintaining braking performance on wet road surfaces.

BACKGROUND ART

The conventional pneumatic tire described in Japanese Unexamined Patent Application Publication No. 2014-076764, for example, is designed to improve both wet performance (braking performance on wet road surfaces) and noise performance (anti-external noise performance). This pneumatic tire includes a plurality of wave-shaped circumferential grooves extending in the tire circumferential direction with left and right groove walls having a wave-like shape with a wavelength and an amplitude, and at least one row of wave-shaped land portions defined by adjacent wave-shaped circumferential grooves. The shape of the left and right groove walls of the wave-shaped circumferential grooves have identical wavelengths but with a phase difference. The groove wall on the wave-shaped land portion side of one of the left and right wave-shaped circumferential grooves that define the row of wave-shaped land portions has an amplitude that is greater than that of the groove wall on the wave-shaped land portion side of the other wave-shaped circumferential groove.

The conventional heavy duty pneumatic tire described in Japanese Unexamined Patent Application Publication No. 61-175104, for example, is designed to improve both wet performance (braking performance on wet road surfaces) and uneven wear resistance performance. This heavy duty pneumatic tire includes a tread that includes at least three main grooves extending in the tire circumferential direction in a zigzag manner that define the tread in the tire lateral direction, shoulder ribs located at least one the outermost sides in the tire lateral direction, and second ribs inwardly adjacent to the shoulder ribs that divide the main grooves. The ridge lines of the shoulder ribs and the second ribs that face the main grooves located outward in the tire lateral direction have a smaller zigzag pitch and amplitude.

In the pneumatic tire of Japanese Unexamined Patent Application Publication No. 2014-076764 described above, the left and right groove walls of the wave-shaped circumferential grooves are disposed with a phase difference, and the groove wall on the wave-shaped land portion side of one of the left and right wave-shaped circumferential grooves that define the row of wave-shaped land portions has an amplitude that is greater than that of the groove wall on the wave-shaped land portion side of the other wave-shaped circumferential groove. As a result, the groove width varies between being wide and being narrow. This leads to the land portion rigidity of the tread portion being non-uniform, and a decrease in wear resistance performance. In the heavy duty pneumatic tire of Japanese Unexamined Patent Application Publication No. 61-175104 described above, the ridge lines of the shoulder ribs and the second ribs that face the main grooves located outward in the tire lateral direction have a smaller zigzag pitch and amplitude. The resulting difference in rigidity may adversely affect uneven wear. Additionally, the corner portions formed by the zigzag shape of the main grooves may experience uneven wear.

SUMMARY

The present technology provides a pneumatic tire that can provide enhanced wear resistance performance while maintaining braking performance on wet road surfaces.

A pneumatic tire according to an embodiment of the present technology comprises:

a tread portion;

four main grooves extending in a tire circumferential direction in a tread surface of the tread portion; and a center land portion, middle land portions adjacent to the center land portion on either side in a tire lateral direction, and shoulder land portions outwardly adjacent to the middle land portions in the tire lateral direction formed by the main grooves;

the main grooves having a wave-like shape with a constant groove width in the tire circumferential direction and with periodic oscillation.

According to the pneumatic tire, the main grooves have a shape with periodic oscillation. This increases the overall width of the main grooves to provide good drainage properties, and allows braking performance on wet road surfaces to be maintained. Additionally, according to the pneumatic tire, the main grooves have a constant groove width in the tire circumferential direction. This allows the rigidity of the land portions (which form the main grooves) near the main grooves to be made uniform, and wear resistance performance to be improved.

A pneumatic tire according to an embodiment of the present technology may have a configuration wherein, a vehicle inner/outer side orientation when the pneumatic tire is mounted on a vehicle is designated; and the middle land portion on the vehicle inner side is provided with an auxiliary groove, the auxiliary groove having a narrower groove width than the main grooves and extending in a linear manner in the tire circumferential direction.

According to the pneumatic tire, the vehicle inner side greatly contributes to drainage properties, and so by the middle land portion on the vehicle inner side being provided with the auxiliary groove extending in a linear manner in the tire circumferential direction, good drainage properties can be provided, and thus the braking performance on wet road surfaces can be improved. Furthermore, the auxiliary groove has a narrower groove width than the main grooves. Thus, a decrease in the rigidity of the middle land portion can be suppressed, and wear resistance performance can be improved.

A pneumatic tire according to an embodiment of the present technology may further comprise a plurality of through lug grooves disposed in the tire circumferential direction; the plurality of through lug grooves each intersecting the tire circumferential direction and continuously passing through the center land portion and the middle land portion on the vehicle outer side, and opening to the main groove on the vehicle outer side of the middle land portion on the vehicle outer side at a first end, passing through the main groove on the vehicle inner side of the center land portion, and terminating within the middle land portion on the vehicle inner side at a second end without reaching the auxiliary groove.

According to the pneumatic tire, the through lug grooves are disposed running continuously through the center land portion and the middle land portion on the vehicle outer side. This connects the center main grooves and the shoulder main grooves on the vehicle outer side. As a result, good drainage properties can be provided, and braking performance on wet road surfaces can be improved. Furthermore, the through lug groove terminates within the middle land portion on the vehicle inner side without reaching the auxiliary groove. This allows a decrease in rigidity of the middle land portion on the vehicle inner side to be suppressed and wear resistance performance to be improved.

A pneumatic tire according to an embodiment of the present technology may have a configuration wherein, the shoulder land portions are provided with a plurality of shoulder land portion lug grooves that intersect the tire circumferential direction disposed in a row in the tire circumferential direction, the plurality of shoulder land portion lug grooves each terminating without reaching the main groove inward of the shoulder land portion in the tire lateral direction.

According to the pneumatic tire, the shoulder land portion lug grooves provide good drainage properties in the shoulder land portions, and the terminating ends within the shoulder land portion allow a decrease in rigidity of the shoulder land portion to be suppressed and wear resistance performance to be improved.

A pneumatic tire according to an embodiment of the present technology may have a configuration wherein, the plurality of shoulder land portion lug grooves each communicate with the main groove inward of the shoulder land portion in the tire lateral direction via a communication narrow groove that has a narrower groove width than the plurality of shoulder land portion lug grooves.

According to the pneumatic tire, the communication narrow grooves provide good drainage properties and allow braking performance on wet road surfaces to be improved. Additionally, the communication narrow grooves have a narrower groove width than the shoulder land portion lug grooves. This allows a decrease in rigidity of the shoulder land portions to be suppressed and wear resistance performance to be improved.

A pneumatic tire according to an embodiment of the present technology may further comprise a lug narrow groove in which a lug groove and a narrow groove are present disposed between the shoulder land portion lug groove and the communication narrow groove.

According to the pneumatic tire, the lug narrow grooves are disposed between the shoulder land portion lug grooves and the communication narrow grooves. This allows excessive changes in rigidity at the communicating portion between the shoulder land portion lug grooves and the communication narrow grooves to be suppressed, and wear resistance performance to be improved.

A pneumatic tire according to an embodiment of the present technology may further comprise a shoulder land portion narrow groove disposed between pairs of the plurality of shoulder land portion lug grooves adjacent in the tire circumferential direction, the shoulder land portion narrow groove intersecting the tire circumferential direction and having a narrower groove width than the plurality of shoulder land portion lug grooves.

According to the pneumatic tire, the shoulder land portion narrow grooves provide good drainage properties and allow braking performance on wet road surfaces to be improved. Additionally, the shoulder land portion narrow grooves have a narrower groove width than the shoulder land portion lug grooves. This allows a decrease in rigidity of the shoulder land portions to be suppressed and wear resistance performance to be improved.

A pneumatic tire according to an embodiment of the present technology may have a configuration wherein, the shoulder land portions are provided with a recessed portion at outer ends in the tire lateral direction; and the shoulder land portion narrow groove terminates at the recessed portion at an outer end portion in the tire lateral direction.

According to the pneumatic tire, the outer end portions of the shoulder land portion narrow grooves in the tire lateral direction terminate at the recessed portions. This prevents loads acting on the outer end portions of the shoulder land portion narrow grooves in the tire lateral direction, and allows a decrease in rigidity of the shoulder land portions to be suppressed and wear resistance performance to be improved.

A pneumatic tire according to an embodiment of the present technology may have a configuration wherein, the lug grooves comprise a chamfer at an opening portion.

According to the pneumatic tire, the lug grooves are formed with the chamfers on the opening portions. This allows a decrease in rigidity of the land portions near the lug grooves to be suppressed and wear resistance performance to be improved.

A pneumatic tire according to an embodiment of the present technology may have a configuration wherein, a vehicle inner/outer side orientation when the pneumatic tire is mounted on a vehicle is designated;

a middle land portion narrow groove that intersects the tire circumferential direction is disposed in the middle land portion on the vehicle outer side, the middle land portion narrow groove communicating with the main groove on the vehicle inner side of the middle land portion at a first end and terminating within the middle land portion at a second end without reaching the main groove on the vehicle outer side of the middle land portion; and a center land portion narrow groove that intersects the tire circumferential direction is disposed in the center land portion, the center land portion narrow groove communicating with the main groove on the vehicle inner side of the center land portion at a first end and terminating within the center land portion at a second end without reaching the main groove on the vehicle outer side of the center land portion.

According to the pneumatic tire, the middle land portion narrow grooves and the center land portion narrow grooves provide good drainage properties and allow braking performance on wet road surfaces to be improved. Additionally, by the middle land portion narrow grooves and the center land portion narrow grooves terminating within the respective land portions, a decrease in rigidity of the land portions can be suppressed and wear resistance performance can be improved.

A pneumatic tire according to an embodiment of the present technology may have a configuration wherein, the tread portion has an asymmetrical pattern in the tire lateral direction; and a difference in groove area ratio between the two regions on either side of a tire equatorial plane in the tire lateral direction is within 2%.

According to the pneumatic tire, the rigidity and the drainage properties of the land portions located in the two regions on either side of the tire equatorial plane in the tire lateral direction can be made uniform, and the effect of enhancing wear resistance performance can be significantly provided while maintaining braking performance on wet road surfaces.

A pneumatic tire according to an embodiment of the present technology may have a configuration wherein, the shoulder land portions comprise recessed portions at an outer end in the tire lateral direction;

the recessed portions are formed in two rows in the tire lateral direction, a laterally inner row with two of the recessed portions in the tire circumferential direction and a laterally outer row with three of the recessed portions in the tire circumferential direction; and the recessed portions of the laterally outer row have a larger diameter than those of the laterally inner row.

According to the pneumatic tire, the recessed portions can improve the appearance of the outer ends of the tread portion in the tire lateral direction.

A pneumatic tire according to an embodiment of the present technology can provide enhanced wear resistance performance while maintaining braking performance on wet road surfaces.

BRIEF DESCRIPTION OF DRAWINGS

FIGS. 7A-7C include a table showing the results of performance tests of pneumatic tires according to Examples of the present technology.

DETAILED DESCRIPTION

Embodiments of the present technology are described in detail below based on the drawings. However, the present technology is not limited to these embodiments. Constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
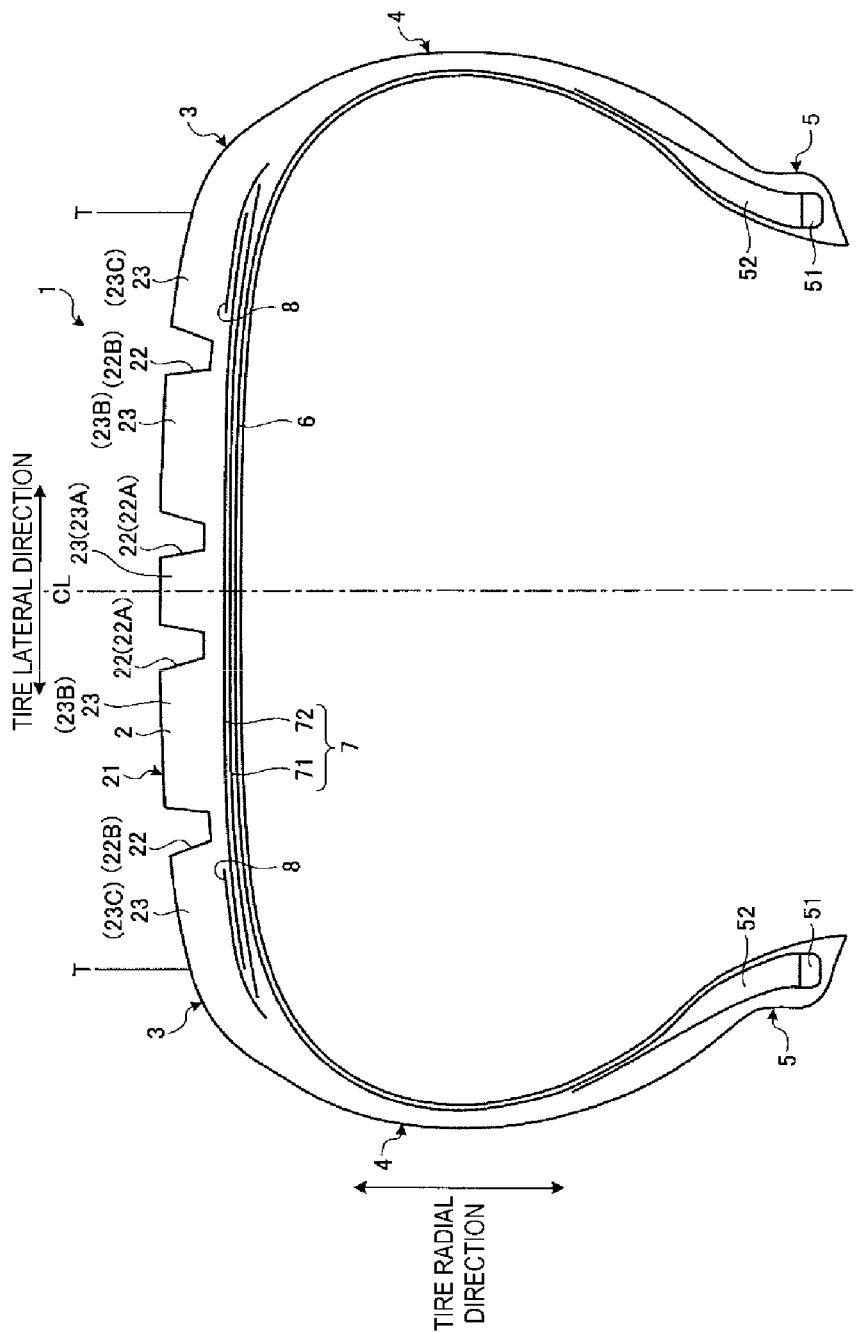
FIG. 1 is a meridian cross-sectional view of a pneumatic tire according to an embodiment of the present technology.
Figure 2:
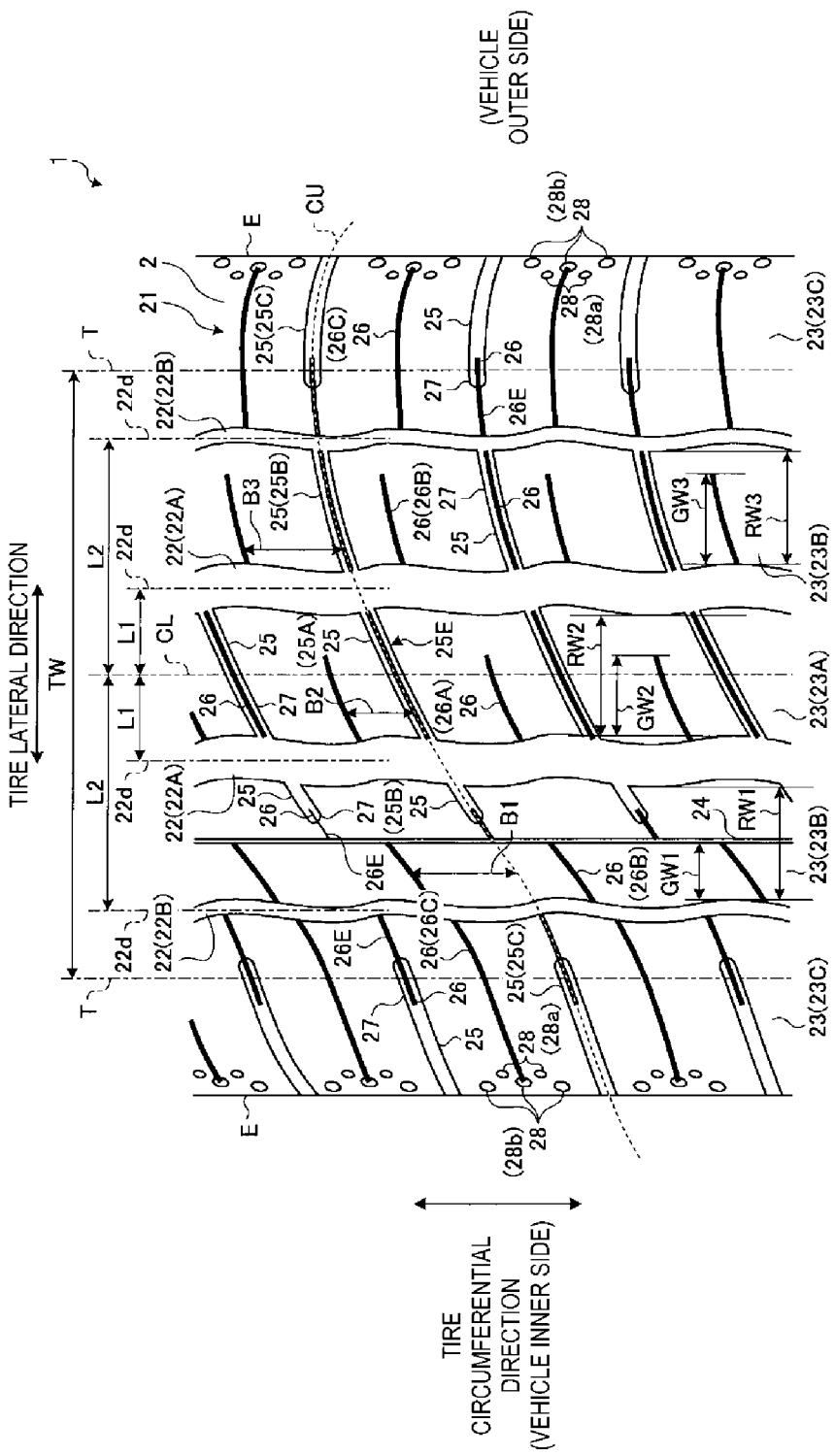
FIG. 2 is a plan view of a tread portion of a pneumatic tire according to an embodiment of the present technology.
Figure 3:
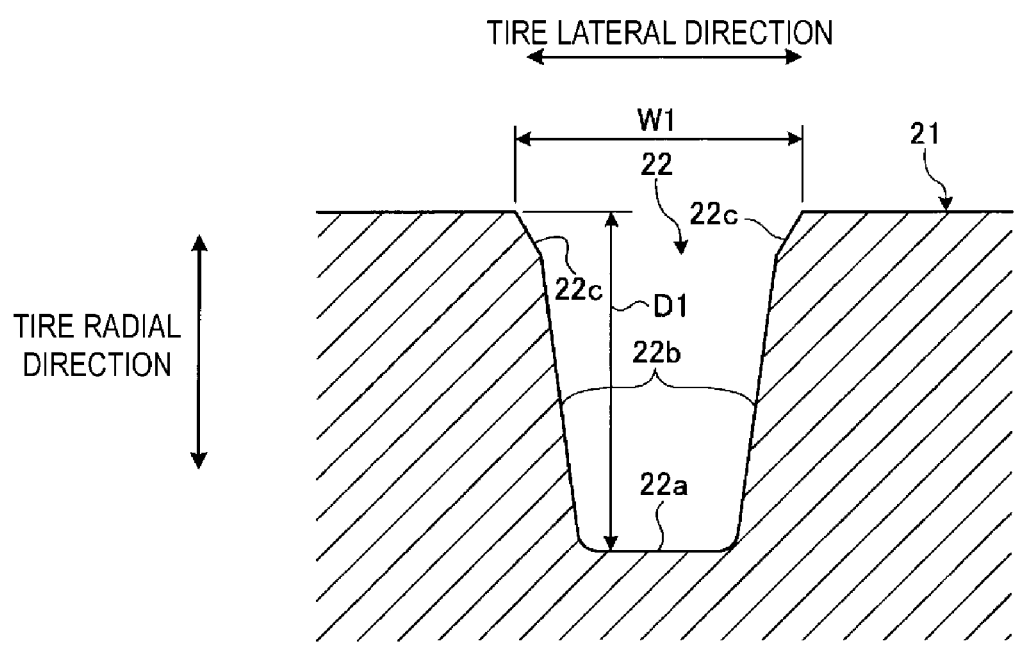
FIG. 3 is an enlarged cross-sectional view of a main groove of a pneumatic tire according to an embodiment of the present technology.
Figure 4:
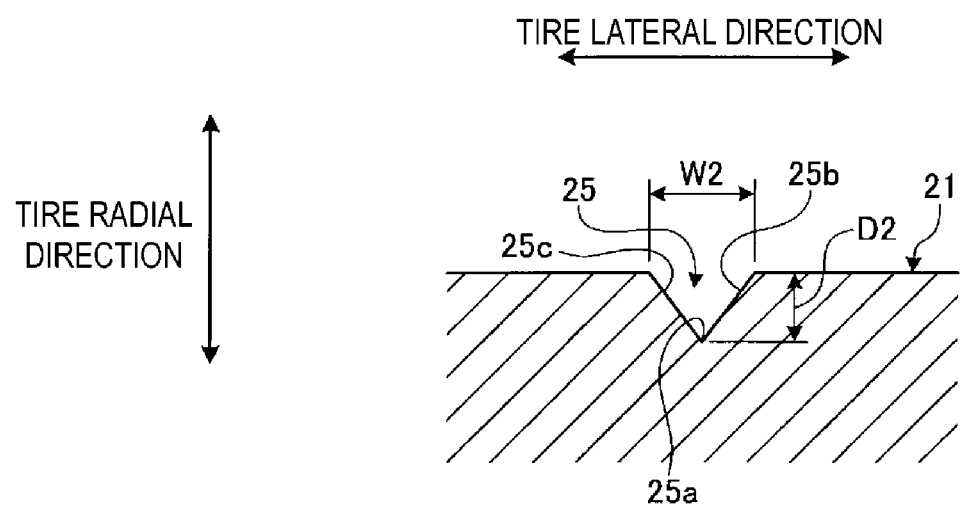
FIG. 4 is an enlarged cross-sectional view of a lug groove of a pneumatic tire according to an embodiment of the present technology.
Figure 5:
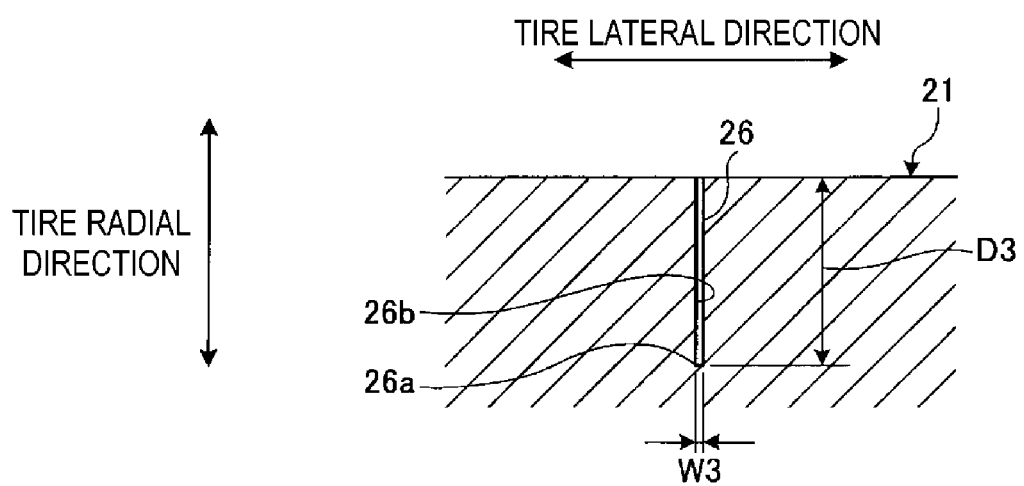
FIG. 5 is an enlarged cross-sectional view of a narrow groove of a pneumatic tire according to an embodiment of the present technology.
Figure 6:
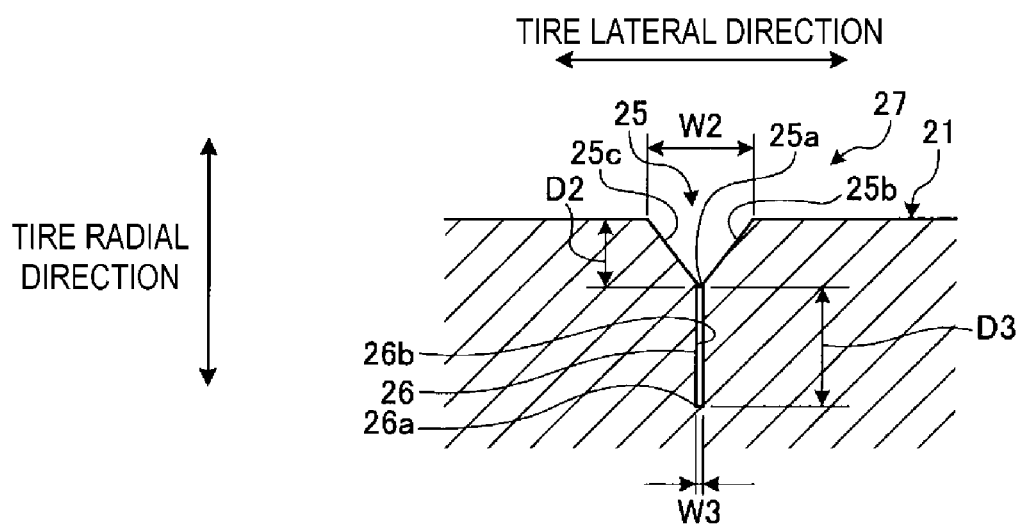
FIG. 6 is an enlarged cross-sectional view of a lug narrow groove of a pneumatic tire according to an embodiment of the present technology.

FIG. 1 is a meridian cross-sectional view of a pneumatic tire according to the present embodiment. FIG. 2 is a plan view of a tread portion of the pneumatic tire according to the present embodiment. FIG. 3 is an enlarged cross-sectional view of a main groove of the pneumatic tire according to the present embodiment. FIG. 4 is an enlarged cross-sectional view of a lug groove of the pneumatic tire according to the present embodiment. FIG. 5 is an enlarged cross-sectional view of a narrow groove of the pneumatic tire according to the present embodiment. FIG. 6 is an enlarged cross-sectional view of a lug narrow groove of the pneumatic tire according to the present embodiment.

Herein, "tire radial direction" refers to the direction orthogonal to the rotation axis (not illustrated) of a pneumatic tire 1. "Inward in the tire radial direction" refers to the direction toward the rotation axis in the tire radial direction. "Outward in the tire radial direction" refers to the direction away from the rotation axis in the tire radial direction. "Tire circumferential direction" refers to the circumferential direction with the rotation axis as the center axis. "Tire lateral direction" refers to the direction parallel with the rotation axis. "Inward in the tire lateral direction" refers to the direction toward a tire equatorial plane (tire equator line) CL in the tire lateral direction. "Outward in the tire lateral direction" refers to the direction away from the tire equatorial plane CL in the tire lateral direction. "Tire equatorial plane CL" refers to the plane orthogonal to the rotation axis of the pneumatic tire 1 that passes through the center of the tire width of the pneumatic tire 1. "Tire width" is the width in the tire lateral direction between components located outward in the tire lateral direction, or in other words, the distance between the components that are the most distant from the tire equatorial plane CL in the tire lateral direction. "Tire equator line" refers to the line along the tire circumferential direction of the pneumatic tire 1 that lies on the tire equatorial plane CL. In the present embodiment, the tire equator line and the tire equatorial plane are both denoted by reference sign CL.

As illustrated in FIG. 1, the pneumatic tire 1 is mainly used on passenger vehicles and includes a tread portion 2, shoulder portions 3 on opposite sides of the tread portion 2, and sidewall portions 4 and bead portions 5 continuing in that order from the shoulder portions 3. The pneumatic tire 1 also includes a carcass layer 6, a belt layer 7, and a belt reinforcing layer 8.

The tread portion 2 is made of rubber material (tread rubber), is exposed on the outermost side of the pneumatic tire 1 in the tire radial direction, and the surface thereof constitutes the contour of the pneumatic tire 1. The outer circumferential surface of the tread portion 2 is a tread surface 21 that mainly comes in contact with a road surface when the tire runs.

The shoulder portions 3 are portions located outward in the tire lateral direction on both sides of the tread portion 2. Additionally, the sidewall portions 4 are exposed on the outermost sides of the pneumatic tire 1 in the tire lateral direction. The bead portions 5 each include a bead core 51 and a bead filler 52. The bead core 51 is formed by a bead wire, which is a steel wire, wound into an annular shape. The bead filler 52 is a rubber material that is disposed in the space formed by an end of the carcass layer 6 in the tire lateral direction folded back at the position of the bead core 51.

The end portions of the carcass layer 6 in the tire lateral direction are folded back around the pair of bead cores 51 from inward to outward in the tire lateral direction, and the carcass layer 6 is stretched in a toroidal shape in the tire circumferential direction to form the framework of the tire. The carcass layer 6 is constituted by a plurality of coating-rubber-covered carcass cords (not illustrated) disposed in alignment at an angle with respect to the tire circumferential direction that conforms with the tire meridian direction. The carcass cords are made of organic fibers (for example, polyester, rayon, and nylon). At least one carcass layer 6 is provided.

The belt layer 7 has a multilayer structure in which at least two belts 71, 72 are layered. In the tread portion 2, the belt layer 7 is disposed outward of the carcass layer 6 in the tire radial direction, i.e. on the outer circumference thereof, and covers the carcass layer 6 in the tire circumferential direction. The belts 71 and 72 each include a plurality of coating-rubber-covered cords (not illustrated) disposed in alignment at a predetermined angle with respect to the tire circumferential direction (for example, from 20° to 30°). The cords are made of steel or organic fibers (for example, polyester, rayon, and nylon). Moreover, the belts 71 and 72 overlap each other and are disposed so that the direction of the cords of the respective belts intersect each other.

The belt reinforcing layer 8 is disposed outward of the belt layer 7 in the tire radial direction, i.e. on the outer circumference thereof, and covers the belt layer 7 in the tire circumferential direction. The belt reinforcing layer 8 includes a plurality of coating-rubber-covered cords (not illustrated) disposed in alignment in the tire lateral direction substantially parallel (±5°) with the tire circumferential direction. The cords are made of steel or organic fibers (for example, polyester, rayon, and nylon). The belt reinforcing layer 8 illustrated in FIG. 1 is disposed so as to cover end portions in the tire lateral direction of the belt layer 7. The configuration of the belt reinforcing layer 8 is not limited to that described above. Although not illustrated in the drawings, a configuration may be used in which the belt reinforcing layer 8 is disposed so as to cover the entire belt layer 7. Alternatively, for example, a configuration with two reinforcing layers may be used, in which the inner reinforcing layer in the tire radial direction is formed larger than the belt layer 7 in the tire lateral direction so as to cover the entire the belt layer 7, and the outer reinforcing layer in the tire radial direction is disposed so as to only cover the end portions of the belt layer 7 in the tire lateral direction. In another example, a configuration with two reinforcing layers may be used, in which both of the reinforcing layers are disposed so as to only cover the end portions of the belt layer 7 in the tire lateral direction. In other words, the belt reinforcing layer 8 overlaps with at least the end portions of the belt layer 7 in the tire lateral direction. Additionally, the belt reinforcing layer 8 is constituted of a band-like strip material (having, for example, a width of 10 mm) wound in the tire circumferential direction.

For the pneumatic tire 1 according to the present embodiment, the vehicle inner/outer side orientation when the pneumatic tire 1 is mounted on a vehicle is designated. In other words, when the pneumatic tire 1 is mounted on a vehicle, the orientation with respect to the inner side and the outer side of the vehicle in the tire lateral direction is designated. While the designated orientation is not illustrated in the drawings, the orientation is indicated, for example, by an indicator provided on the sidewall portion 4. For the pneumatic tire 1, the side facing the inner side of the vehicle when mounted on the vehicle is referred to as a "vehicle inner side" and a side facing the outer side of the vehicle is referred to as a "vehicle outer side". Note that the designations of the vehicle inner side and the vehicle outer side are not limited to cases where the tire 1 is mounted on a vehicle. For example, rims have an orientation with respect to the inner side and outer side of the vehicle in the tire lateral direction. Thus, when the pneumatic tire 1 is mounted on a rim, the orientation with respect to the vehicle inner side and the vehicle outer side in the tire lateral direction is designated.

As illustrated in FIGS. 1 and 2, in the pneumatic tire 1 as described above, four main grooves 22 extending in the tire circumferential direction are formed in the tread surface 21 of the tread portion 2.

The main grooves 22 include two center main grooves 22A disposed adjacent to the center in the tire lateral direction on either side of the tire equatorial plane CL and shoulder main grooves 22B disposed outward of the center main grooves 22A in the tire lateral direction. Additionally, five land portions 23 are formed by the main grooves 22 in the tread surface 21. The land portions 23 include a center land portion 23A disposed between the center main grooves 22A and on the tire equatorial plane CL; middle land portions 23B disposed between the center main grooves 22A and the shoulder main grooves 22B and outwardly adjacent to the center land portion 23A in the tire lateral direction; and shoulder land portions 23C disposed outward of the shoulder main grooves 22B in the tire lateral direction, outwardly adjacent to the middle land portions 23B in the tire lateral direction, and outermost in the tread portion 2 in the tire lateral direction.

The main grooves 22 (22A, 22B) have a wave-like shape with periodic oscillation and a constant groove width W1 in the tire circumferential direction. The wave-like shape of the main grooves 22 can be such that a groove bottom 22a illustrated in FIG. 3 has a linear shape in the tire circumferential direction and groove walls 22b have periodic oscillation such that the groove width W1 is constant in the tire circumferential direction. Alternatively, the wave-like shape of the main grooves 22 can be such that the groove bottom 22a and the groove walls 22b illustrated in FIG. 3 have periodic oscillation such that the groove width W1 is constant in the tire circumferential direction. In the present embodiment, as illustrated in FIG. 3, the main grooves 22 are formed with a chamfer 22c on the opening edges. The groove width W1 of the main grooves 22 is the opening width to the tread surface 21. Thus, the groove width W1 of the main grooves 22 with the chamfer 22c is the groove width W1 between the outer edges of the chamfers 22c. As illustrated in FIG. 3, the center main grooves 22A of the main grooves 22 has a groove width W1 ranging from 5 mm to 12 mm and a groove depth D1 ranging from 4 mm to 8 mm. The shoulder main grooves 22B have a groove width W1 ranging from 3 mm to 6 mm and a groove depth D1 ranging from 4 mm to 8 mm. The groove width W1 of the center main grooves 22A is greater than that of the shoulder main grooves 22B. For example, the groove width W1 of the shoulder main grooves 22B ranges from 10% to 50% of the groove width W1 of the center main grooves 22A. This is preferable to maintain the drainage properties of the center main grooves 22A and to ensure the rigidity of the land portions 23 around the shoulder main grooves 22B. Additionally, as illustrated in FIG. 2, the center main grooves 22A of the main grooves 22 have a central line 22d of oscillation located a distance L1 outward from the tire equatorial plane CL in the tire lateral direction, the distance L1 being a distance ranging from 20% to 30% of a ground contact width TW. The shoulder main grooves 22B have a central line 22d of oscillation located a distance L2 outward from the tire equatorial plane CL in the tire lateral direction, the distance L2 being a distance ranging from 60% to 70% of the ground contact width TW. This is preferable to maintain the drainage properties of the center main grooves 22A and to ensure the rigidity of the land portions 23 around the shoulder main grooves 22B. The edge shape and dimensions of the land portions 23 in the tire lateral direction can be determined depending on the oscillation and position in the tire lateral direction of the main grooves 22.

Herein, "ground contact width TW" refers to the width of the ground contact region in the tire lateral direction. Additionally, the outermost edges of the ground contact region in the tire lateral direction are referred to as ground contact edges T. FIG. 2 illustrates the ground contact edges T as being continuous in the tire circumferential direction. The ground contact region is the region where the tread surface 21 of the tread portion 2 of the pneumatic tire 1 comes into contact with a dry road surface, when the pneumatic tire 1 is mounted on a regular rim, inflated to the regular internal pressure, and loaded with 70% of the regular load. "Regular rim" refers to a "standard rim" defined by the Japan Automobile Tyre Manufacturers Association Inc. (JATMA), a "design rim" defined by the Tire and Rim Association, Inc.

(TRA), or a "measuring rim" defined by the European Tyre and Rim Technical Organisation (ETRTO). "Regular internal pressure" refers to "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO.

In the pneumatic tire 1 according to the present embodiment, the middle land portion 23B on the vehicle inner side is provided with an auxiliary groove 24 extending in a linear manner in the tire circumferential direction. The auxiliary groove 24 has a narrower groove width than the main groove 22 with the smallest groove width W1. The auxiliary groove 24 is centrally disposed between the center main groove 22A and the shoulder main groove 22B that form the middle land portion 23B on the vehicle inner side. The auxiliary groove 24 divides the middle land portion 23B on the vehicle inner side into rib land portions adjacent in the tire lateral direction. The auxiliary groove 24 has a groove width ranging from 1 mm to less than 3 mm and a groove depth ranging from 4 mm to 8 mm.

In the pneumatic tire 1 according to the present embodiment, the land portions 23 are provided with lug grooves 25 and narrow grooves 26 that intersect the tire circumferential direction. The lug grooves 25 provided in the center land portion 23A are referred to as center land portion lug grooves 25A, the lug grooves 25 provided in the middle land portions 23B are referred to as middle land portion lug grooves 25B, and the lug grooves 25 provided in the shoulder land portions 23C are referred to as shoulder land portion lug grooves 25C. The narrow grooves 26 provided in the center land portion 23A are referred to as center land portion narrow grooves 26A, the narrow grooves 26 provided in the middle land portions 23B are referred to as middle land portion narrow grooves 26B, and the narrow grooves 26 provided in the shoulder land portions 23C are referred to as shoulder land portion narrow grooves 26C. The narrow grooves 26 that communicate with a terminating end of one of the lug grooves 25 and connect to one of the main grooves 22 or the auxiliary grooves 24 are referred to as communication narrow grooves 26E. Additionally, in the pneumatic tire 1 according to the present embodiment, a lug narrow groove 27 is provided where both the lug groove 25 and the narrow groove 26 are present and connected.

As illustrated in FIG. 4, the lug groove 25 includes groove walls 25b formed with a chamfer 25c from the opening portion in the tread surface 21 to a groove bottom 25a. The lug groove 25 has a groove width W2 ranging from 2 mm to 4 mm and a groove depth D2 less than that of the main grooves 22 and the auxiliary groove 24 ranging from 2 mm to 6 mm. As illustrated in FIG. 5, the narrow groove 26 includes groove walls 26b formed from the opening portion in the tread surface 21 to a groove bottom 26a in the tire radial direction. The narrow groove 26 has a groove width W3 ranging from 0.4 mm to 1.0 mm and a groove depth D3 less than that of the main grooves 22 and the auxiliary groove 24 ranging from 3 mm to 6 mm. As illustrated in FIG. 6, the lug narrow groove 27 includes the lug groove 25 and the narrow groove 26 formed in the groove bottom 25a of the lug groove 25 in the extension direction of the lug groove 25. The sum of the groove depth D2 of the lug groove 25 and the groove depth D3 of the narrow groove 26 makes an overall groove depth of 6 mm or less, less than that of the main grooves 22 and the auxiliary groove 24. Additionally, the groove depth D3 of the narrow groove 26 of the lug narrow groove 27 is preferably 70% or greater of the overall groove depth (D2+D3) of the lug narrow groove 27 including the lug groove 25.

The center land portion lug grooves 25A provided in the center land portion 23A are disposed in the tire circumferential direction. The center land portion lug grooves 25A communicate at both ends with the center main grooves 22A that form the center land portion 23A and divide the center land portion 23A into a plurality of blocks disposed in a row in the tire circumferential direction. Note that in the present embodiment, the center land portion lug grooves 25A are composed overall of the lug narrow grooves 27 where both the lug grooves 25 and the narrow grooves 26 are present.

The middle land portion lug grooves 25B provided in the middle land portion 23B on the vehicle outer side are disposed in the tire circumferential direction. The middle land portion lug grooves 25B communicate at both ends with the center main groove 22A and the shoulder main groove 22B that form the middle land portion 23B on the vehicle outer side and divide the middle land portion 23B on the vehicle outer side into a plurality of blocks disposed in a row in the tire circumferential direction. Additionally, the middle land portion lug grooves 25B provided in the middle land portion 23B on the vehicle outer side communicate at one end with the shoulder main groove 22B that forms the middle land portion 23B on the vehicle outer side and terminates there. Note that in the present embodiment, the middle land portion lug grooves 25B provided in the middle land portion 23B on the vehicle outer side are composed overall of the lug narrow grooves 27 where both the lug grooves 25 and the narrow grooves 26 are present.

The middle land portion lug grooves 25B provided in the middle land portion 23B on the vehicle inner side communicate at the first end with the center main groove 22A that forms the middle land portions 23B on the vehicle inner side and terminates at the second end within the middle land portion 23B on the vehicle inner side without reaching the auxiliary groove 24. Accordingly, the middle land portion 23B on the vehicle inner side is formed as a rib-like land portion. Note that in the present embodiment, the middle land portion lug grooves 25B provided in the middle land portion 23B on the vehicle inner side are, at the terminating end portion, lug narrow grooves 27 where both the lug grooves 25 and the narrow grooves 26 are present. The communication narrow groove 26E extends from the narrow groove 26 of the lug narrow groove 27 and communicates with the auxiliary groove 24.

The middle land portion lug grooves 25B disposed in the middle land portion 23B on the vehicle outer side and the center land portion lug grooves 25A disposed in the center land portion 23A are disposed such that in a plan view they are one groove that passes through the center main groove 22A on the vehicle outer side, with both ends at the center main groove 22A between the middle land portion 23B on the vehicle outer side and the center land portion 23A facing one another. The center land portion lug grooves 25A provided disposed the center land portion 23A and the middle land portion lug grooves 25B disposed in the middle land portion 23B on the vehicle inner side are disposed such that in a plan view they are one groove that passes through the center main groove 22A on the vehicle inner side, with both ends at the center main groove 22A between the center land portion 23A and the middle land portion 23B on the vehicle inner side facing one another. Thus, the middle land portion lug groove 25B provided in the middle land portion 23B on the vehicle outer side, the center land portion lug groove 25A provided in the center land portion 23A, and the middle land portion lug groove 25B provided in the middle land portion 23B on the vehicle inner side constitute one through lug groove 25E that passes through the center main grooves 22A. In other words, a plurality of the through lug grooves 25E are disposed in the tire circumferential direction. The through lug grooves 25E intersect the tire circumferential direction and continuously pass through the center land portion 23A and the middle land portion 23B on the vehicle outer side. Also, the through lug grooves 25E open to the shoulder main groove 22B on the vehicle outer side of the middle land portion 23B on the vehicle outer side at the first end, pass through the center main groove 22A on the vehicle inner side of the center land portion 23A, and terminate within the middle land portion 23B on the vehicle inner side at the second end without reaching the auxiliary groove 24.

The shoulder land portion lug grooves 25C disposed in each of the shoulder land portions 23C are disposed in a row in the tire circumferential direction and intersect the tire circumferential direction. The shoulder land portion lug grooves 25C open at the first end to a design end E, which is the outer end of the tread surface 21 of the tread portion 2 in the tire lateral direction, and terminate at the second end within the shoulder land portion 23C without reaching the shoulder main groove 22B located inward of the shoulder land portion 23C in the tire lateral direction. Accordingly, the shoulder land portions 23C are formed as rib-like land portions. Note that in the present embodiment, the shoulder land portion lug grooves 25C provided in the shoulder land portions 23C are, at the terminating end portion, lug narrow grooves 27 where both the lug grooves 25 and the narrow grooves 26 are present. The communication narrow groove 26E extends from the narrow groove 26 of the lug narrow groove 27 and communicates with the shoulder main grooves 22B. Additionally, terminating end portions of the shoulder land portion lug grooves 25C, which are lug narrow grooves 27, are disposed on the ground contact edges T.

Herein, design end E refers to the outermost end of the tread portion 2 in the tire lateral direction disposed outward of the ground contact edge T in the tire lateral direction, and is the outermost end of the tread portion 2 in the tire lateral direction where grooves are formed. In FIG. 2, the design end E is illustrated as being continuous in the tire circumferential direction. In other words, in the tread portion 2, when the tire is placed on a dry, flat road surface, the region from the ground contact edge T to the design end E is a region which does not typically come into contact with the ground.

Note that the shoulder land portion lug grooves 25C provided in the shoulder land portions 23C terminate within the shoulder land portions 23C and are separated from the through lug grooves 25E described above. However, the first end of the through lug groove 25E, i.e. the end of the middle land portion lug groove 25B provided in the middle land portion 23B on the vehicle outer side that communicates with the shoulder main groove 22B, is disposed on an extension of the end portion where the shoulder land portion lug groove 25C provided in the shoulder land portion 23C on the vehicle outer side terminates within the shoulder land portion 23C. Additionally, the second end of the through lug groove 25E, i.e. the end of the middle land portion lug groove 25B provided in the middle land portion 23B on the vehicle inner side, is disposed on an extension of the end portion where the shoulder land portion lug groove 25C provided in the shoulder land portion 23C on the vehicle inner side terminates within the shoulder land portion 23C. In other words, the lug grooves 25 that include the shoulder land portion lug grooves 25C provided in the shoulder land portions 23C and the through lug grooves 25E (the middle land portion lug grooves 25B of the middle land portion 23B on the vehicle outer side, the center land portion lug grooves 25A of the center land portion 23A, and the middle land portion lug grooves 25B of the middle land portion 23B on the vehicle inner side) are disposed on a smooth, continuous curved line CU that crosses the land portions 23A, 23B, 23C between the outer ends (design ends E) of the tread portion 2 in the tire lateral direction. Curved line CU refers to a line having only tangent lines with an angle ranging from 40° to 90° with respect to the tire lateral direction.

The center land portion narrow grooves 26A of the narrow grooves 26 provided in the center land portion 23A are disposed between pairs of the center land portion lug grooves 25A adjacent in the tire circumferential direction and intersect the tire circumferential direction. The center land portion narrow grooves 26A communicate with the center main groove 22A on the vehicle inner side of the center land portion 23A at the first end, and terminate within the center land portion 23A at the second end without reaching the center main groove 22A on the vehicle outer side of the center land portion 23A.

The middle land portion narrow grooves 26B provided in the middle land portion 23B on the vehicle outer side are disposed between pairs of the middle land portion lug grooves 25B adjacent in the tire circumferential direction and intersect the tire circumferential direction. The middle land portion narrow grooves 26B communicate with the center main groove 22A at the middle land portion 23B at the first end, and terminate within the middle land portions 23B at the second end without reaching the shoulder main groove 22B at the middle land portion 23B.

The middle land portion narrow grooves 26B provided in the middle land portion 23B on the vehicle inner side are disposed between extensions of pairs of the middle land portion lug grooves 25B adjacent in the tire circumferential direction and intersect the tire circumferential direction. The middle land portion narrow grooves 26B communicate at both ends with the shoulder main groove 22B at the middle land portion 23B and with the auxiliary groove 24. Thus, the middle land portion narrow grooves 26B provided in the middle land portion 23B on the vehicle inner side divide a portion of the middle land portion 23B between the shoulder main groove 22B and the auxiliary groove 24 into a plurality of blocks disposed in a row in the tire circumferential direction.

The shoulder land portion narrow grooves 26C provided in the shoulder land portions 23C are disposed between pairs of the shoulder land portion lug grooves 25C adjacent in the tire circumferential direction and intersect the tire circumferential direction. The shoulder land portion narrow grooves 26C communicate with the shoulder main grooves 22B at the first end and terminate at the second end within the shoulder land portions 23C near the outer ends of the tread portion 2 in the tire lateral direction (design ends E), extending beyond the ground contact edges T.

Note that the shoulder land portions 23C are provided with recessed portions 28 near the outer ends of the tread portion 2 in the tire lateral direction (design ends E). The recessed portions 28 have a circular dimple shape and are formed between pairs of the shoulder land portion lug grooves 25C adjacent in the tire circumferential direction in two rows in the tire lateral direction, a laterally inner row 28a with two recessed portions 28 in the tire circumferential direction and a laterally outer row 28b with three recessed portions 28 in the tire circumferential direction. Additionally, the recessed portions 28 of the laterally outer row 28b have a larger diameter than those of the laterally inner row 28a. The shoulder land portion narrow grooves 26C provided in the shoulder land portions 23C terminate at the recessed portions 28 at the second ends. In the present embodiment, the shoulder land portion narrow grooves 26C terminate at the recessed portion 28 of the laterally outer row 28b centrally located in the tire circumferential direction.

In such a manner, the pneumatic tire 1 according to the present embodiment is provided with four main grooves 22 in the tread surface 21 of the tread portion 2, each extending in the tire circumferential direction. The main grooves 22 form the center land portion 23A, the middle land portions 23B adjacent to the center land portion 23A on either side in the tire lateral direction, and the shoulder land portions 23C outwardly adjacent to the middle land portions 23B in the tire lateral direction. The main grooves 22 have a wave-like shape with a constant groove width in the tire circumferential direction and with periodic oscillation. The vehicle inner/outer side orientation when the pneumatic tire 1 is mounted on a vehicle may be designated.

According to the pneumatic tire 1, the main grooves 22 have a wave-like shape with periodic oscillation. This increases the overall width of the main grooves 22 to provide good drainage properties, and allows braking performance on wet road surfaces to be maintained. Additionally, according to the pneumatic tire 1, the main grooves 22 have a constant groove width in the tire circumferential direction. This allows the rigidity of the land portions 23 (which are formed by the main grooves 22) near the main grooves 22 to be made uniform, and wear resistance performance to be improved.

Preferably, for the pneumatic tire 1 according to the present embodiment, the vehicle inner/outer side orientation when the pneumatic tire 1 is mounted on a vehicle is designated, and the auxiliary groove 24 is provided in the middle land portion 23B on the vehicle inner side, the auxiliary groove 24 having a narrower groove width than the main grooves 22 and extending in a linear manner in the tire circumferential direction.

According to the pneumatic tire 1, the vehicle inner side greatly contributes to drainage properties, and so by the middle land portion 23B on the vehicle inner side being provided with the auxiliary groove 24 extending in a linear manner in the tire circumferential direction, good drainage properties can be provided, and thus the braking performance on wet road surfaces can be improved. Furthermore, the auxiliary groove 24 has a narrower groove width than the main grooves 22. Thus, a decrease in the rigidity of the middle land portion 23B can be suppressed, and wear resistance performance can be improved.

Preferably, the pneumatic tire 1 according to the present embodiment includes a plurality of the through lug grooves 25E disposed in the tire circumferential direction. The through lug grooves 25E intersect the tire circumferential direction and continuously pass through the center land portion 23A and the middle land portion 23B on the vehicle outer side. Also, the through lug grooves 25E open to the shoulder main groove 22B on the vehicle outer side of the middle land portion 23B on the vehicle outer side at the first end, pass through the center main groove 22A on the vehicle inner side of the center land portion 23A, and terminate within the middle land portion 23B on the vehicle inner side at the second end without reaching the auxiliary groove 24.

According to the pneumatic tire 1, the through lug grooves 25E are disposed running continuously through the center land portion 23A and the middle land portion 23B on the vehicle outer side. This connects the center main grooves 22A and the shoulder main grooves 22B on the vehicle outer side. As a result, good drainage properties can be provided, and braking performance on wet road surfaces can be improved. Furthermore, the through lug groove 25E terminates within the middle land portion 23B on the vehicle inner side without reaching the auxiliary groove 24. This allows a decrease in rigidity of the middle land portion 23B on the vehicle inner side to be suppressed and wear resistance performance to be improved.

Preferably, in the pneumatic tire 1 according to the present embodiment, the shoulder land portions 23C are provided with the shoulder land portion lug grooves 25C that intersect the tire circumferential direction in a row in the tire circumferential direction, the shoulder land portion lug grooves 25C terminating without reaching the shoulder main groove 22B inward of the shoulder land portion 23C in the tire lateral direction.

According to the pneumatic tire 1, the shoulder land portion lug grooves 25C provide good drainage properties in the shoulder land portions 23C, and the terminating ends within the shoulder land portion 23C allow a decrease in rigidity of the shoulder land portion 23C to be suppressed and wear resistance performance to be improved.

Preferably, in the pneumatic tire 1 according to the present embodiment, the shoulder land portion lug grooves 25C communicate with the shoulder main groove 22B inward of the shoulder land portion 23C in the tire lateral direction via the communication narrow groove 26E, which has a narrower groove width than itself.

Furthermore, according to the pneumatic tire 1, the communication narrow grooves 26E provide good drainage properties and allow braking performance on wet road surfaces to be improved. Additionally, the communication narrow groove 26E have a narrower groove width than the shoulder land portion lug grooves 25C. This allows a decrease in rigidity of the shoulder land portions 23C to be suppressed and wear resistance performance to be improved.

Preferably, in the pneumatic tire 1 according to the present embodiment, the lug narrow grooves 27 in which the lug grooves 25 and the narrow grooves 26 are present are disposed between the shoulder land portion lug grooves 25C and the communication narrow grooves 26E.

According to the pneumatic tire 1, the lug narrow grooves 27 are disposed between the shoulder land portion lug grooves 25C and the communication narrow grooves 26E. This allows excessive changes in rigidity at the communicating portion between the shoulder land portion lug grooves 25C and the communication narrow grooves 26E to be suppressed, and wear resistance performance to be improved.

Preferably, in the pneumatic tire 1 according to the present embodiment, the shoulder land portion narrow grooves 26C are disposed between pairs of the shoulder land portion lug grooves 25C adjacent in the tire circumferential direction. The shoulder land portion narrow grooves 26C intersect the tire circumferential direction and have a narrower groove width than the shoulder land portion lug grooves 25C.

According to the pneumatic tire 1, the shoulder land portion narrow grooves 26C provide good drainage properties and allow braking performance on wet road surfaces to be improved. Additionally, the shoulder land portion narrow grooves 26C have a narrower groove width than the shoulder land portion lug grooves 25C. This allows a decrease in rigidity of the shoulder land portions 23C to be suppressed and wear resistance performance to be improved.

Preferably, in the pneumatic tire 1 according to the present embodiment, the shoulder land portions 23C are provided with recessed portions 28 at the outer ends in the tire lateral direction, and the shoulder land portion narrow grooves 26C terminate at the recessed portions 28 at the outer end portion in the tire lateral direction.

According to the pneumatic tire 1, the outer end portions of the shoulder land portion narrow grooves 26C in the tire lateral direction terminate at the recessed portions 28. This prevents loads acting on the outer end portions of the shoulder land portion narrow grooves 26C in the tire lateral direction, and allows a decrease in rigidity of the shoulder land portions 23C to be suppressed and wear resistance performance to be improved.

Preferably, in the pneumatic tire 1 according to the present embodiment, the lug grooves 25 are formed with the chamfers 25c on the opening portions.

According to the pneumatic tire 1, the lug grooves 25 are formed with the chamfers 25c on the opening portions. This allows a decrease in rigidity of the land portions near the lug grooves 25 to be suppressed and wear resistance performance to be improved.

Preferably, in the pneumatic tire 1 according to the present embodiment, the vehicle inner/outer side orientation when the tire is mounted on the vehicle is designated; and the middle land portion narrow grooves 26B that intersect the tire circumferential direction are disposed in the middle land portion 23B on the vehicle outer side. The middle land portion narrow grooves 26B communicate with the center main groove 22A on the vehicle inner side of the middle land portion 23B at the first end and terminate within the middle land portion 23B at the second end without reaching the shoulder main groove 22B on the vehicle outer side of the middle land portion 23B. The center land portion narrow grooves 26A that intersect the tire circumferential direction are disposed in the center land portion 23A. The center land portion narrow grooves 26A communicate with the center main groove 22A on the vehicle inner side of the center land portion 23A at the first end and terminate within the center land portion 23A at the second end without reaching the center main groove 22A on the vehicle outer side of the center land portion 23A.

According to the pneumatic tire 1, the middle land portion narrow grooves 26B and the center land portion narrow grooves 26A provide good drainage properties and allow braking performance on wet road surfaces to be improved. Additionally, by the middle land portion narrow grooves 26B and the center land portion narrow grooves 26A terminating within the respective land portions 23B, 23A, a decrease in rigidity of the land portions 23B, 23A can be suppressed and wear resistance performance can be improved.

Preferably, in the pneumatic tire 1 according to the present embodiment, the tread portion 2 has an asymmetrical pattern in the tire lateral direction, and the difference in groove area ratio between the two regions on either side of the tire equatorial plane CL in the tire lateral direction is within 2%.

Herein, "groove area ratio" is defined as groove area/(groove area+ground contact area) expressed as a percentage. "Groove area" is the total opening area of all of the grooves in the contact patch (ground contact region). Additionally, the groove area and the ground contact region are the regions measured when the pneumatic tire 1 is mounted on a regular rim, inflated to the regular internal pressure, and loaded with 70% of the regular load.

According to the pneumatic tire 1, the rigidity and the drainage properties of the land portions located in the two regions on either side of the tire equatorial plane CL in the tire lateral direction can be made uniform, and the effect of enhancing wear resistance performance can be significantly provided while maintaining braking performance on wet road surfaces. Note that the groove area ratio is preferably higher on the vehicle inner side which contributes more to drainage properties.

Preferably, in the pneumatic tire 1 according to the present embodiment, the recessed portions 28 are formed at the outer ends of the shoulder land portions 23C in the tire lateral direction. The recessed portions 28 are formed in two rows in the tire lateral direction, the laterally inner row 28a with two recessed portions 28 in the tire circumferential direction and the laterally outer row 28b with three recessed portions 28 in the tire circumferential direction. The recessed portions 28 of the laterally outer row 28b have a larger diameter than those of the laterally inner row 28a.

According to the pneumatic tire 1, the recessed portions 28 can improve the appearance of the outer ends of the tread portion 2 in the tire lateral direction. Note that the portion where the recessed portions 28 are formed are portions located outward from the ground contact edges T in the tire lateral direction and do not normally come into contact with a dry road surface. As such, they do not affect the running of the vehicle.

The pneumatic tire 1 according to the present embodiment is provided with the tread portion 2, four main grooves 22 in the tread surface 21 of the tread portion 2, each extending in the tire circumferential direction. The main grooves 22 form the center land portion 23A, the middle land portions 23B adjacent to the center land portion 23A on either side in the tire lateral direction, and the shoulder land portions 23C outwardly adjacent to the middle land portions 23B in the tire lateral direction. The main grooves 22 have a wave-like shape with periodic oscillation. The lug grooves 25 are disposed in the land portions 23A, 23B, 23C in a row in the tire circumferential direction and intersect the tire circumferential direction. The lug grooves 25 are disposed on the smooth, continuous curved line CU that crosses the land portions 23A, 23B, 23C between the outer ends of the tread portion 2 in the tire lateral direction.

According to the pneumatic tire 1, the main grooves 22 have a wave-like shape with periodic oscillation. This increases the overall width of the main grooves 22 to provide good drainage properties, and allows braking performance on wet road surfaces to be maintained. Additionally, according to the pneumatic tire 1, the lug grooves 25 are disposed on the smooth, continuous curved line CU that crosses the land portions 23A, 23B, 23C between the outer ends of the tread portion 2 in the tire lateral direction. This allows good drainage properties to be provided between the land portions 23A, 23B, 23C, and braking performance on wet road surfaces to be maintained. Furthermore, the lug grooves 25 are disposed on the smooth, continuous curved line CU that crosses the land portions 23A, 23B, 23C between the outer ends of the tread portion 2 in the tire lateral direction. This allows an excessive difference in rigidity between the land portions 23A, 23B, 23C in the tire lateral direction to be suppressed. Thus, wear resistance performance can be improved.

Preferably, in the pneumatic tire 1 according to the present embodiment, a plurality of the lug grooves 25 on the same curved line CU communicate with a main groove 22 at both ends.

According to the pneumatic tire 1, better drainage properties is provided between the land portions 23A, 23B, 23C, and braking performance on wet road surfaces can be improved.

Preferably, in the pneumatic tire 1 according to the present embodiment, the vehicle inner/outer side orientation when the tire is mounted on the vehicle is designated. The lug grooves 25 include the through lug grooves 25E disposed in the tire circumferential direction that continuously pass through the center land portion 23A and the middle land portion 23B on the vehicle outer side. Also, the through lug grooves 25E open to the shoulder main groove 22B on the vehicle outer side of the middle land portion 23B on the vehicle outer side at the first end, pass through the center main groove 22A on the vehicle inner side of the center land portion 23A, and terminate within the middle land portion 23B on the vehicle inner side at the second end.

According to the pneumatic tire 1, the through lug grooves 25E are disposed running continuously through the center land portion 23A and the middle land portion 23B on the vehicle outer side. This connects the center main grooves 22A and the shoulder main grooves 22B on the vehicle outer side. As a result, good drainage properties can be provided, and braking performance on wet road surfaces can be improved. Furthermore, the through lug groove 25E terminates within the middle land portion 23B on the vehicle inner side. This allows a decrease in rigidity of the middle land portion 23B on the vehicle inner side to be suppressed and wear resistance performance to be improved.

Preferably, in the pneumatic tire according to the present embodiment, the shoulder land portions 23C are provided with the shoulder land portion narrow grooves 26C between pairs of the shoulder land portion lug grooves 25C adjacent in the tire circumferential direction that intersect the tire circumferential direction. The shoulder land portion narrow grooves 26C communicate with the shoulder main groove 22B inward of the shoulder land portion 23C in the tire lateral direction at the first end and terminate within the shoulder land portion 23C at the second end. The middle land portions 23B are provided with the middle land portion narrow grooves 26B between pairs of the middle land portion lug grooves 25B adjacent in the tire circumferential direction that intersect the tire circumferential direction. The middle land portion narrow grooves 26B communicate with one of the main grooves 22 (the center main groove 22A or the shoulder main groove 22B) at the middle land portion 23B at the first end and terminate within the middle land portion 23B at the second end without reaching the other main groove 22 (shoulder main groove 22B or center main groove 22A) at the middle land portion 23B. The center land portion 23A is provided with the center land portion narrow grooves 26A between pairs of the center land portion lug grooves 25 A adjacent in the tire circumferential direction that intersect the tire circumferential direction. The center land portion narrow grooves 26A communicate with one of the center main grooves 22A at the center land portion 23A at the first end and terminate within the center land portion 23A at the second end without reaching the other center main groove 22A at the center land portion 23A.

According to the pneumatic tire 1, the narrow grooves 26A, 26B, 26C are disposed in the respective land portions 23A, 23B, 23C, and communicate with a main groove 22 at the first end and terminate within the corresponding land portion 23A, 23B, 23C at the second end. This allows good drainage properties to be provided, and allows a decrease in rigidity of the land portions 23A, 23B, 23C to be suppressed and braking performance on wet road surfaces be maintained. Thus, wear resistance performance can be improved.

Preferably, in the pneumatic tire 1 according to the present embodiment, the vehicle inner/outer side orientation when the tire is mounted on the vehicle is designated; and the middle land portion narrow grooves 26B that intersect the tire circumferential direction are disposed in the middle land portions 23B. The middle land portion narrow grooves 26B communicate with one of the main grooves 22 at the middle land portion 23B (the center main groove 22A or the shoulder main groove 22B) at the first end and terminate within the middle land portion 23B at the second end without reaching the other main groove 22 at the middle land portion 23B (shoulder main groove 22B or the center main groove 22A). The center land portion narrow grooves 26A that intersect the tire circumferential direction are disposed in the center land portion 23A. The center land portion narrow grooves 26A communicate with one of the center main grooves 22A at the center land portion 23A at the first end and terminate within the center land portion 23A at the other end without reaching the other center main groove 22A at the center land portion 23A. The ratios A1, A2, A3 satisfy the relationship $A1<A2<A3$, where A1 is the ratio between a lateral dimension RW1 of the middle land portion 23B on the vehicle inner side and a lateral dimension GW1 of the middle land portion narrow grooves 26B provided in the middle land portion 23B on the vehicle inner side, A2 is the ratio between a lateral dimension RW2 of the center land portion 23A and a lateral dimension GW2 of the center land portion narrow grooves 26A provided in the center land portion 23A, and A3 is a ratio between a lateral dimension RW3 of the middle land portion 23B on the vehicle outer side and a lateral dimension GW3 of the middle land portion narrow grooves 26B provided in the middle land portion 23B on the vehicle outer side.

According to the pneumatic tire 1, the ratios between the lateral dimensions of the land portions 23 and the lateral dimensions of the narrow grooves 26 increase in order from the vehicle inner side to the vehicle outer side. In other words, the lateral dimensions of the narrow grooves 26 are greater relative to the lateral dimension of the corresponding land portion 23 from the vehicle inner side toward the vehicle outer side. As a result, the narrow grooves 26 on the vehicle inner side, which may include many grooves to contribute to drainage properties, have smaller lateral dimensions than those on the vehicle outer side. This allows an extreme difference in rigidity between the center land portion 23A and the middle land portions 23B to be suppressed. Thus, wear resistance performance can be improved.

Preferably, in the pneumatic tire 1 according to the present embodiment, the vehicle inner/outer side orientation when the tire is mounted on the vehicle is designated. The middle land portion narrow grooves 26B that intersect the tire circumferential direction are disposed in the middle land portions 23B between pairs of the middle land portion lug grooves 25B adjacent in the tire circumferential direction. The center land portion narrow grooves 26A that intersect the tire circumferential direction are disposed between pairs of the center land portion lug grooves 25A adjacent in the tire circumferential direction. The ratios B1, B2, B3 satisfy the relationships $B2<B1$ and $B2<B3$, where B1 is a shortest distance B1 of the middle land portion narrow grooves 26B to the predetermined curved line CU in the middle land portion 23B on the vehicle inner side, B2 is a shortest distance of the center land portion narrow grooves 26A to the curved line CU in the center land portion 23A, and B3 is a shortest distance of the middle land portion narrow grooves 26B to the curved line CU in the middle land portion 23B on the vehicle outer side.

According to the pneumatic tire 1, the distance of the narrow grooves 26 from the lug grooves 25 in the center land portion 23A has a magnitude relationship opposite to that of the middle land portions 23B on either side. As a result, an extreme difference in rigidity between the center land portion 23A and the middle land portions 23B can be suppressed. Thus, wear resistance performance can be improved.

EXAMPLES

In the examples, performance tests for wear resistance performance and braking performance on wet road surfaces were performed on a plurality of types of pneumatic tires of different conditions (see FIGS. 7A-7C).

In these performance tests, pneumatic tires having a tire size of 205/55R16 were assembled on 16×6.5 J rims, inflated to the regular internal pressure (200 kPa), and mounted on a test vehicle (1600 cc, front engine front wheel drive sedan passenger vehicle).

Wear resistance performance was evaluated by driving the test vehicle described above on a test course with a dry road surface for 5000 km and then measuring the wear of the land portions via the amount of main groove remaining. Then, the measurement results were expressed as index values with the value of the Conventional Example being defined as the reference (100). In this evaluation, larger values indicate less wear, which is preferable.

Braking performance on wet road surfaces was evaluated by measuring the braking distance of the test vehicle from a speed of 100 km/h on a wet road surface test course with a water depth of 1 mm. Then, the measurement results were expressed as index values with the value of the Conventional Example being defined as the reference (100). In this evaluation, larger values indicate less braking distance, which is preferable.

In FIGS. 7A-7C, the pneumatic tires that were used as the test tires had a configuration including five land portions formed by four main grooves on the tread surface, the land portions including the center land portion disposed on the tire equatorial plane CL, the middle land portions disposed adjacent to the center land portion on the two sides in the tire lateral direction, and the shoulder land portions disposed adjacent to the middle land portions on the outer sides in the tire lateral direction.

The pneumatic tire of the Conventional Example indicated in FIGS. 7A-7C include main grooves that oscillate in a wave-like manner with a non-constant groove width.

The pneumatic tires of Examples 1 to 12 include main grooves that oscillate in a wave-like manner with a constant groove width. The pneumatic tires of Examples 2 to 12 include an auxiliary groove. The pneumatic tires of Examples 3 to 12 include an integral through lug groove, formed by the lug grooves of the center land portion and the middle land portion on the vehicle outer side communicating with the main grooves at both ends and the lug grooves of the middle land portion on the vehicle inner side communicating with a main groove at the first end. In the pneumatic tires of Examples 4 to 12, the lug grooves of the shoulder land portions terminate within the land portions without communicating with the main grooves. In the pneumatic tires of Examples 5 to 12, the lug grooves of the shoulder land portions communicate with the main groove via the communication narrow grooves. In the pneumatic tires of Examples 6 to 12, the lug narrow grooves are disposed between the lug grooves of the shoulder land portions and the communication narrow grooves. In the pneumatic tires of Examples 7 to 12, the narrow grooves of the shoulder land portions communicate with the main groove. In the pneumatic tires of Examples 8 to 12, the narrow grooves terminate at one of the recessed portions disposed in the shoulder land portion. In the pneumatic tires of Examples 9 to 12, the opening portions of the lug grooves are formed with the chamfers. In the pneumatic tires of Examples 10 to 12, the narrow grooves of the center land portion and the middle land portions terminate within the land portion at one end portion without communicating with a main groove. In the pneumatic tires of Examples 11 and 12, the tread portion has an asymmetrical pattern in the tire lateral direction, and the difference in groove area ratio between the two regions on either side of the tire equatorial plane in the tire lateral direction is within 2%, with the vehicle inner side having a higher groove area ratio. In the pneumatic tire of Example 12, the recessed portions disposed in the shoulder land portions are formed in two rows in the tire lateral direction, the laterally inner row with two recessed portions in the tire circumferential direction and the laterally outer row with three recessed portions in the tire circumferential direction. The recessed portions of the laterally outer row also have a larger diameter than those of the laterally inner row.

As can be seen from the test results shown in FIGS. 7A-7C, the pneumatic tires of Examples 1 to 12 provided enhanced wear resistance performance while maintaining braking performance on wet road surfaces.

The invention claimed is:

1. A pneumatic tire with a designated vehicle inner/outer side orientation when the pneumatic tire is mounted on a vehicle, the pneumatic tire, comprising:
   a tread portion;
   four main grooves extending in a tire circumferential direction in a tread surface of the tread portion; and
   a center land portion, middle land portions adjacent to the center land portion on either side in a tire lateral direction, and shoulder land portions outwardly adjacent to the middle land portions in the tire lateral direction formed by the main grooves;
   the main grooves having a wave-like shape with a constant groove width in the tire circumferential direction and with periodic oscillation;
   the middle land portion on the vehicle inner side being provided with an auxiliary groove, the auxiliary groove having a narrower groove width than the main grooves and extending in a linear manner in the tire circumferential direction;
   middle land portion lug grooves being provided in the middle land portion on the vehicle inner side, communicating at a first end with a center main groove of the four main grooves, and terminating at a second end within the middle land portion on the vehicle inner side without reaching the auxiliary groove;
   the middle land portion lug grooves having a groove width ranging from 2 mm to 4 mm;
   communication narrow grooves extending from the middle land portion lug grooves and communicating with the auxiliary groove;
   the communication narrow grooves having a groove width ranging from 0.4 mm to 1.0 mm;
   middle land portion narrow grooves being provided in the middle land portion on the vehicle inner side, communicating at a first end with shoulder main groove of the four main grooves and at a second end with the auxiliary groove;

the middle land portion narrow grooves having a groove width ranging from 0.4 mm to 1.0 mm;

the middle land portion narrow grooves being disposed between extensions of pairs of the middle land portion lug grooves adjacent in the tire circumferential direction; and the middle land portion narrow grooves intersecting the tire circumferential direction.

2. A pneumatic tire with a designated vehicle inner/outer side orientation when the pneumatic tire is mounted on a vehicle, the pneumatic tire, comprising:

a tread portion;

four main grooves extending in a tire circumferential direction in a tread surface of the tread portion;

a center land portion, middle land portions adjacent to the center land portion on either side in a tire lateral direction, and shoulder land portions outwardly adjacent to the middle land portions in the tire lateral direction formed by the main grooves; and a plurality of through lug grooves disposed in the tire circumferential direction;

the main grooves having a wave-like shape with a constant groove width in the tire circumferential direction and with periodic oscillation;

the middle land portion on the vehicle inner side being provided with an auxiliary groove, the auxiliary groove having a narrower groove width than the main grooves and extending in a linear manner in the tire circumferential direction;

the plurality of through lug grooves having a groove width ranging from 2 mm to 4 mm; and the plurality of through lug grooves each intersecting the tire circumferential direction and continuously passing through the center land portion and the middle land portion on the vehicle outer side, and opening to the main groove on the vehicle outer side of the middle land portion on the vehicle outer side at a first end, passing through the main groove on the vehicle inner side of the center land portion, and terminating within the middle land portion on the vehicle inner side at a second end without reaching the auxiliary groove.

3. The pneumatic tire according to claim 2, wherein the through lug grooves comprise a chamfer at an opening portion.

4. The pneumatic tire according to claim 2, wherein a vehicle inner/outer side orientation when the pneumatic tire is mounted on a vehicle is designated;

a middle land portion narrow groove that intersects the tire circumferential direction is disposed in the middle land portion on the vehicle outer side, the middle land portion narrow groove communicating with the main groove on the vehicle inner side of the middle land portion at a first end and terminating within the middle land portion at a second end without reaching the main groove on the vehicle outer side of the middle land portion; and a center land portion narrow groove that intersects the tire circumferential direction is disposed in the center land portion, the center land portion narrow groove communicating with the main groove on the vehicle inner side of the center land portion at a first end and terminating within the center land portion at a second end without reaching the main groove on the vehicle outer side of the center land portion.

5. The pneumatic tire according to claim 2, wherein the tread portion has an asymmetrical pattern in the tire lateral direction; and a difference in groove area ratio between the two regions on either side of a tire equatorial plane in the tire lateral direction is within 2%.

6. The pneumatic tire according to claim 2, wherein the shoulder land portions comprise recessed portions at an outer end in the tire lateral direction;

the recessed portions are formed in two rows in the tire lateral direction, a laterally inner row with two of the recessed portions in the tire circumferential direction and a laterally outer row with three of the recessed portions in the tire circumferential direction; and the recessed portions of the laterally outer row have a larger diameter than those of the laterally inner row.

7. The pneumatic tire according to claim 2, wherein the auxiliary groove divides the middle land portion on the vehicle inner side into rib land portions adjacent in the tire lateral direction; and rib land portions are not divided in the tire circumferential direction by other lug grooves.

8. The pneumatic tire according to claim 2, wherein the shoulder land portions are provided with a plurality of shoulder land portion lug grooves that intersect the tire circumferential direction disposed in a row in the tire circumferential direction, the plurality of shoulder land portion lug grooves each terminating without reaching the main groove inward of the shoulder land portion in the tire lateral direction.

9. The pneumatic tire according to claim 8, wherein the plurality of shoulder land portion lug grooves each communicate with the main groove inward of the shoulder land portion in the tire lateral direction via a communication narrow groove that has a narrower groove width than the plurality of shoulder land portion lug grooves.

10. The pneumatic tire according to claim 9, further comprising a lug narrow groove in which a lug groove and a narrow groove are present disposed between the shoulder land portion lug groove and the communication narrow groove.

11. The pneumatic tire according to claim 8, further comprising a shoulder land portion narrow groove disposed between pairs of the plurality of shoulder land portion lug grooves adjacent in the tire circumferential direction, the shoulder land portion narrow groove intersecting the tire circumferential direction and having a narrower groove width than the plurality of shoulder land portion lug grooves.

12. The pneumatic tire according to claim 11, wherein the shoulder land portions are provided with a recessed portion at outer ends in the tire lateral direction; and the shoulder land portion narrow groove terminates at the recessed portion at an outer end portion in the tire lateral direction.

* * * * *